(12) United States Patent
Lee

(10) Patent No.: US 6,256,699 B1
(45) Date of Patent: Jul. 3, 2001

(54) RELIABLE INTERRUPT RECEPTION OVER BUFFERED BUS

(75) Inventor: Glenn E. Lee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/212,016

(22) Filed: Dec. 15, 1998

(51) Int. Cl.⁷ .................................................. G06F 13/00
(52) U.S. Cl. ......................... 710/126; 710/100; 710/263; 710/268
(58) Field of Search ................................ 710/126–128, 710/107, 260–269

(56) References Cited

U.S. PATENT DOCUMENTS

| | | | |
|---|---|---|---|
| 4,991,169 | 2/1991 | Davis et al. | 370/77 |
| 5,122,691 | 6/1992 | Balakrishnan | 307/475 |
| 5,301,275 * | 4/1994 | Vanbuskirk et al. | 710/48 |
| 5,594,727 | 1/1997 | Kolbenson et al. | 370/442 |
| 5,659,542 | 8/1997 | Bell et al. | 370/496 |
| 5,721,828 * | 2/1998 | Frisch | 709/217 |
| 5,732,079 | 3/1998 | Castrigno | 370/362 |
| 5,742,649 | 4/1998 | Muntz et al. | 375/371 |
| 5,796,732 | 8/1998 | Mazzola et al. | 370/362 |
| 5,826,093 * | 10/1998 | Assouad et al. | 712/43 |
| 5,898,848 * | 4/1999 | Gulick | 710/128 |
| 5,913,045 * | 6/1999 | Gillespie et al. | 710/129 |
| 5,920,572 * | 7/1999 | Washington et al. | 370/535 |
| 5,925,099 * | 7/1999 | Futral et al. | |
| 5,928,338 * | 7/1999 | Lawman | 710/8 |
| 5,941,964 * | 8/1999 | Young et al. | 710/100 |
| 5,974,051 | 10/1999 | De Nicolo et al. | 370/447 |
| 6,122,693 * | 9/2000 | Gutta et al. | 710/107 |
| 6,122,716 * | 9/2000 | Combs | 711/163 |
| 6,154,223 * | 11/2000 | Baldwin | 345/506 |

* cited by examiner

*Primary Examiner*—Paul R. Myers
(74) *Attorney, Agent, or Firm*—David B. Ritchie; Thelen Reid & Priest LLP

(57) ABSTRACT

A method and apparatus for reliable interrupt reception over a buffered bus utilizes a mailbox register to receive interrupt request information sent after a data write transaction. The data is sent from an initiating peripheral device over the buffered bus to arrive with an arbitrary delay at the host memory. After completing the sending phase for the data the initiating peripheral device sends a mailbox register data block containing an interrupt request to a mailbox register associated with the host processor. Because the mailbox register data block will necessarily arrive after the receipt of the actual data in the host memory because it is following the actual data through the same buffered bus, the interrupt will be properly sequenced with the receipt of data.

13 Claims, 5 Drawing Sheets

RELIABLE INTERRUPT RECEPTION OVER BUFFERED BUS

STATEMENT OF RELATED APPLICATION

This application is related to U.S. patent application Ser. No. 09/212,880 filed on even date herewith in the name of the same inventor and commonly assigned herewith.

BACKGROUND OF THE INVENTION

1. Field of the Invention

The present invention relates to maintaining data coherency and consistency ("transaction ordering") in data transfer operations which occur asynchronously from their corresponding interrupt signals. More particularly, the present invention relates to reliable interrupt generation and reception over a buffered bus.

2. The Background

Asynchronous communication between computer system components, such as controlling the flow of data operations between peripheral devices ("peripherals"), and a host processor through a buffered bus using interrupt signals ("interrupts") to advise the host processor of a request for a particular operation, are known in the art.

Referring now to FIG. 1, peripherals such as network interface modules (port adapters) 10, 12 connect network media from networks 14, 16, respectively, to a first bus 18 which may be a PCI (peripheral component interchange) bus or a similar tppe of bus. Other peripherals such as a storage adapter 20, display adapter 22 and audio adapter 24, to name a few, may also be attached to first bus 18 as shown in FIG. 1.

A second bus 26, preferably using a first bus architecture such as a local bus architecture couples one or more host processors 28 with one or more instances of host memory 30.

A bridge 32 with buffering capability is used to couple a first bus 18 (there may be one or more instances of first bus 18 and bridge 32) to second bus 26.

When a peripheral has data requiring processing by host processor 28, two events occur asynchronously. In the first event, the peripheral performs a write transaction which includes sending the data to host memory 30 through first bus 18, buffering bridge 32 and second bus 26. The write transaction includes an address phase indicating a target location in host memory 30 and at least one data phase indicating the data to be stored in host memory 30, thus data is typically sent in a number of data blocks including data and header information indicating address information. In the second event, the peripheral uses an interrupt request to notify host processor 28, even when host processor is busy (such as when it is executing program code), that a data transaction needs to be processed. The interrupt reaches host processor 28 through first bus 18, bridge 32 and second bus 26. Host processor 28 then responds to the interrupt request by accessing the data from host memory 30 and sends an acknowledgement signal back to the originating peripheral over second bus 26, bridge 32 and first bus 18.

Using first bus 18 and bridge 32 to send data and interrupt requests to host processor 28 presents a number of disadvantages. First, a delay period ("latency") is incurred between the time that the interrupt request is sent to first bus 18 and the time that it is received by host processor 28. Second, this latency may be increased depending upon the number of peripherals arbitrating for the use of the first bus 18. Furthermore, such an approach inherently creates a race condition between data to be processed by host processor 28 and the interrupt requests corresponding to that data. Such a race condition can sometimes result in the interrupt being received and acted upon by host processor 28 before the corresponding data has been received in host memory 30. In such a situation, data may be lost.

Some solutions to the race condition problem exist. In accordance with one solution, the peripheral signaling the interrupt performs a read of the data written to host memory 30 to verify receipt in memory prior to sending the interrupt signal over the buffered bus to the host processor 28. This solution is easy to implement. Having the peripheral perform the read is much better than having the host processor perform the read from a processor throughput point of view. A major disadvantage is that the peripheral must execute a read cycle over the bus which could take a relatively long time due to bus arbitration and time required to traverse all bridges (there may be more than one) in the path. Another problem with this solution is that it can have the side effect of providing the host processor 28 with a spurious interrupt This can happen when (1) the peripheral device writes block 1 of data and block 2 of data into host memory 30; (2) the host memory 30 receives block 1 and block 2; (3) the peripheral device begins reading the host memory to verify receipt and reads block 1; (4) the peripheral device generates an interrupt for block 1 to the host processor 28; (5) the receipt of block 2 by the peripheral device is delayed due to latency; (6) the host processor 28 receives the first interrupt, acknowledges it and acts on it by processing all of the contents of host memory 30 including block 1 and block 2; (7) the read of block 2 by the peripheral device is completed and the peripheral device sends a second interrupt request to the host processor 28; and (8) the host processor 28 acknowledges and acts on the second interrupt only to find that it has already processed the contents of host memory 30.

In another solution the host processor 30, or a device associated with it, performs a read operation to a register of the peripheral device in response to receipt of the interrupt request before accessing the data written by the peripheral into host memory. This guarantees that all of the data to be written to the host memory will necessarily have cleared the buffers before this step can be completed. This approach can increase latency because the read operation can be further delayed due to bus arbitration issues under loaded conditions.

In accordance with yet another solution shown in FIG. 2, a separate non-buffered path (34, 35, 38, 40, 42) is provided for each peripheral to signal the interrupt request to a special interrupt input register 44 in the host processor. This approach requires the provision of a separate path outside the bus structure for each such peripheral used for data communication and therefore requires special purpose hardware. This approach is also subject to a race condition because the interrupt can arrive before all data has cleared all intermediate buffers.

Accordingly, a need exists for a method and apparatus for reliable generation, transmission and reception of interrupt requests over buffered buses without the interrupt requests incurring significant delay due to buffering and without creating a race condition between the interrupt requests and corresponding data.

SUMMARY OF THE INVENTION

A method and apparatus for reliable interrupt reception over a buffered bus utilizes a mailbox register to receive interrupt request information sent after a data write transaction. The data is sent from an initiating peripheral device over the buffered bus to arrive with an arbitrary delay at the host memory. After completing the sending phase for the data the initiating peripheral device sends a mailbox register data block containing an interrupt request to a mailbox register associated with the host processor. Because the mailbox register data block will necessarily arrive after the receipt of the actual data in the host memory because it is following the actual data through the same buffered bus, the interrupt will be properly sequenced with the receipt of data.

DETAILED DESCRIPTION OF THE PREFERRED EMBODIMENTS

Figure 1:
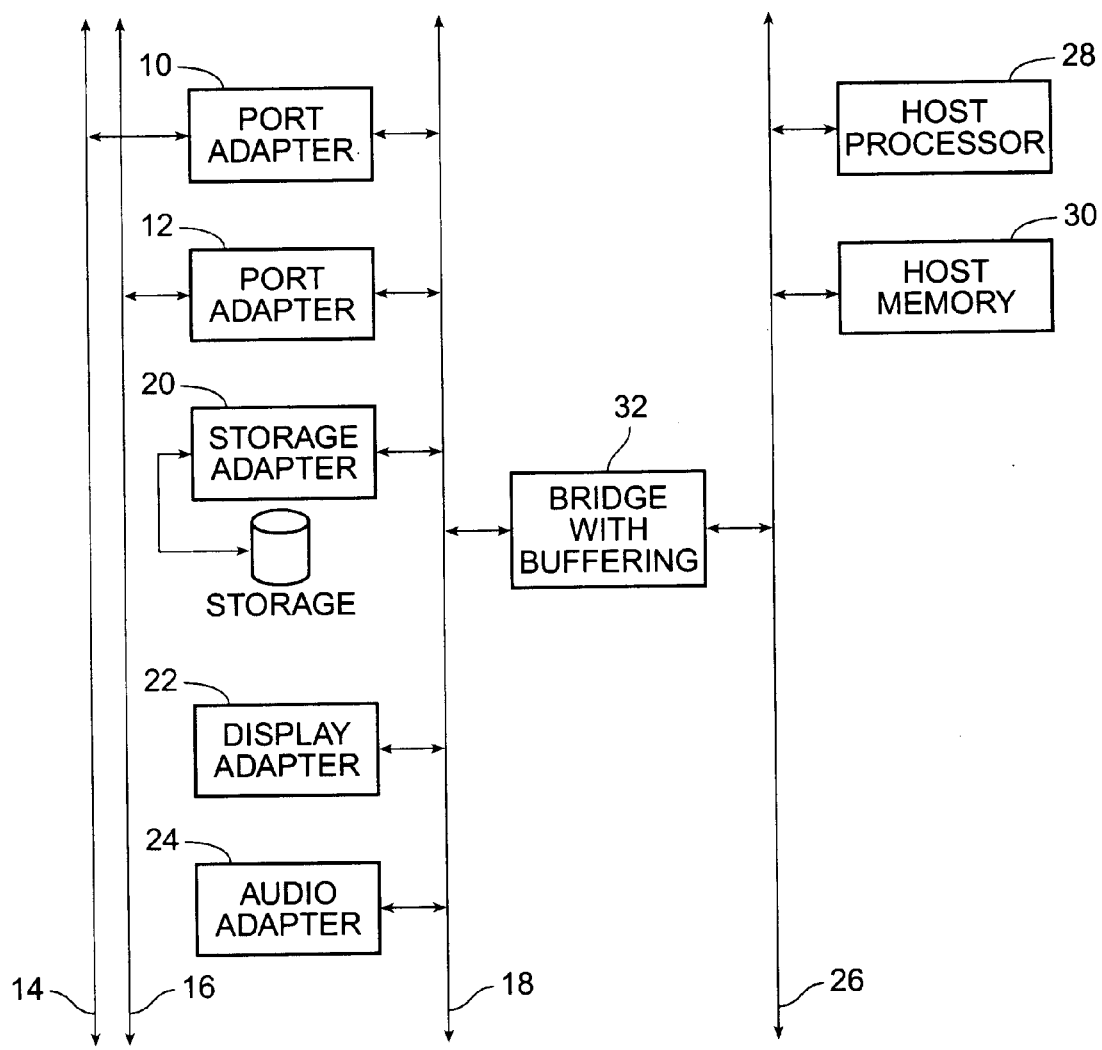
FIG. 1 is a system block diagram of a system having a buffered transaction bus.

Those of ordinary skill in the art will realize that the following description of the present invention is illustrative only and not intended to be in any way limiting. Other embodiments of the invention will readily suggest themselves to such skilled persons after a perusal of the within disclosure.

In accordance with the present invention a method and apparatus is presented which overcome limitations of the prior art. Reliable interrupt reception by a host processor properly synchronized with receipt of data in host memory is accomplished by utilizing a mailbox register to receive interrupt request information sent after a data write transaction. The data is sent from an initiating peripheral device over the buffered bus to arrive with an arbitrary delay at the host memory. After completing the sending phase for the data the initiating peripheral device sends a mailbox register data block containing an interrupt request to a mailbox register associated with the host processor over the same buffered bus. Because the mailbox register data block will necessarily arrive in the mailbox register after the receipt of the actual data in the host memory, the interrupt will be properly sequenced with the receipt of data.

While a presently preferred embodiment of the present invention employs a PCI (peripheral component interchange) architecture to implement the buffered bus, other architectures supporting buffered buses are also within the scope of this invention. Similarly, while a presently preferred embodiment of the present invention receives packets from port adapters interfaced to data communications network segments, transmits them to host memory, has a host processor process the packets in accordance with various protocols, and retransmits the packets from port adapters, other forms of data and types of processing are also within the scope of this invention.

Certain assumptions may be made regarding the operation of buffered busses. First, posted write transactions must be completed on the target bus segment in the order in which they are received from the initiator bus segment. Second, delayed write transactions do not pass previously posted write transactions. Third, delayed read transactions "push" previously posted write transactions—that is to say that the posted write transactions must be completed on the target bus segment before the delayed read request can be attempted on the target bus segment. Fourth, delayed read transactions for data traveling in the same direction must push previously posted write data. That is to say that when the initiator of the read transaction is on the same side of the bridge as the target of the write transaction, the posted write transaction must be completed to the target before the read data is returned to the initiator. Fifth, write transactions flowing in one direction have no ordering requirements with respect to write transactions flowing in the other direction—thus the bridge can accept posted write transactions on both interfaces at the same time, and the bridge can initiate posted write transactions on both interfaces at the same time. Sixth, the bridge accepts posted write transactions, regardless of the state of completion of any delayed transactions (read or write) being forwarded across the bridge.

Figure 3:
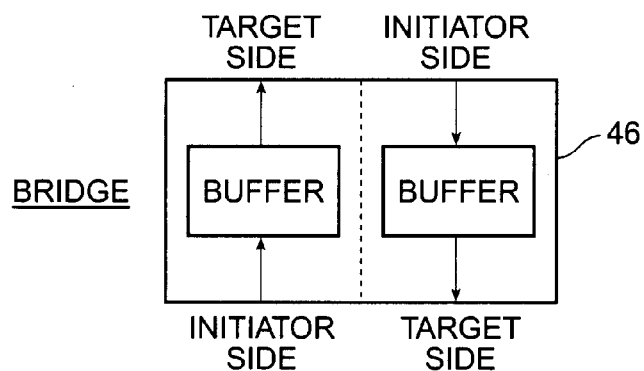
FIG. 3 is a block diagram of a buffered bridge device.
Figure 4:
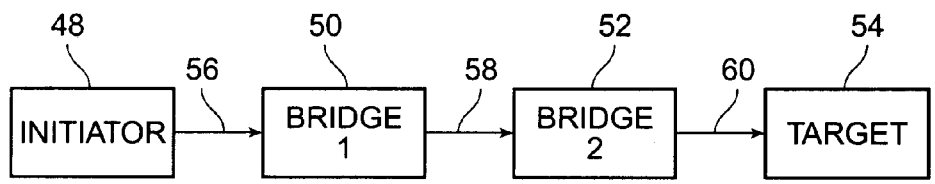
FIG. 4 is a block diagram of a buffered bus.

A posted write transaction is diagrammed in FIG. 3. In a posted write transaction, an "initiator" (say, for example, a peripheral device) communicates with a preferably two-way buffering bridge device 46 which may be a PCI bridge device. The initiator has a data write transaction to perform across bridge 46. This is diagrammed in FIG. 4, for example, where an initiator 48 must send data across bridge 1 (50) and bridge 2 (52) to be received at target 54. To get the data from initiator 48 to target 54 initiator 48 performs a posted write transaction to bridge 1 (50). When the bus segment 56 is available the data goes into a buffer in bridge 1 (50). Bridge 1 (50) thereupon attempts a posted write to bridge 2 (52). When the bus segment 58 is available the data moves to the buffer in bridge 2 (52). Finally bridge 2 (52) attempts a write into target 54. When the bus segment 60 is available, it will complete the write transaction. Other devices may contend for the use of these bus segments and conventional bus arbitration schemes are used to resolve which device will obtain access at any given instant. Posted write transactions introduce latency and synchronization problems.

A delayed write transaction differs from a posted write transaction. In a delayed write transaction the initiator 48 waits until it has acquired access to bus segments 56, 58 and 60. It may have to wait a while for this. Then, when all segments are available, a non-buffered write transaction is passed directly from initiator 48 to target 54 without significant buffering delays at bridges 1 (50) and 2 (52).

Figure 5:
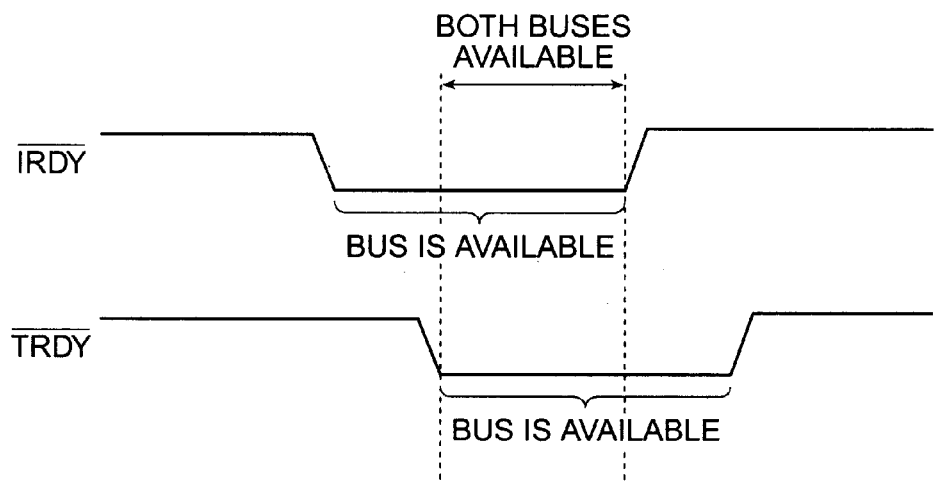
FIG. 5 is a timing diagram of some signals generated by the bridge device.

FIG. 5 shows the timing of signals IRDY (initiator ready, active low) and TRDY (target ready, active low) which are generated by a bridge such as bridge 46. When IRDY is low, the initiator side bus segment is available. When TRDY is low, the target side bus segment is available. When they are both low, both busses are available and a delayed write transaction is possible.

Figure 6:
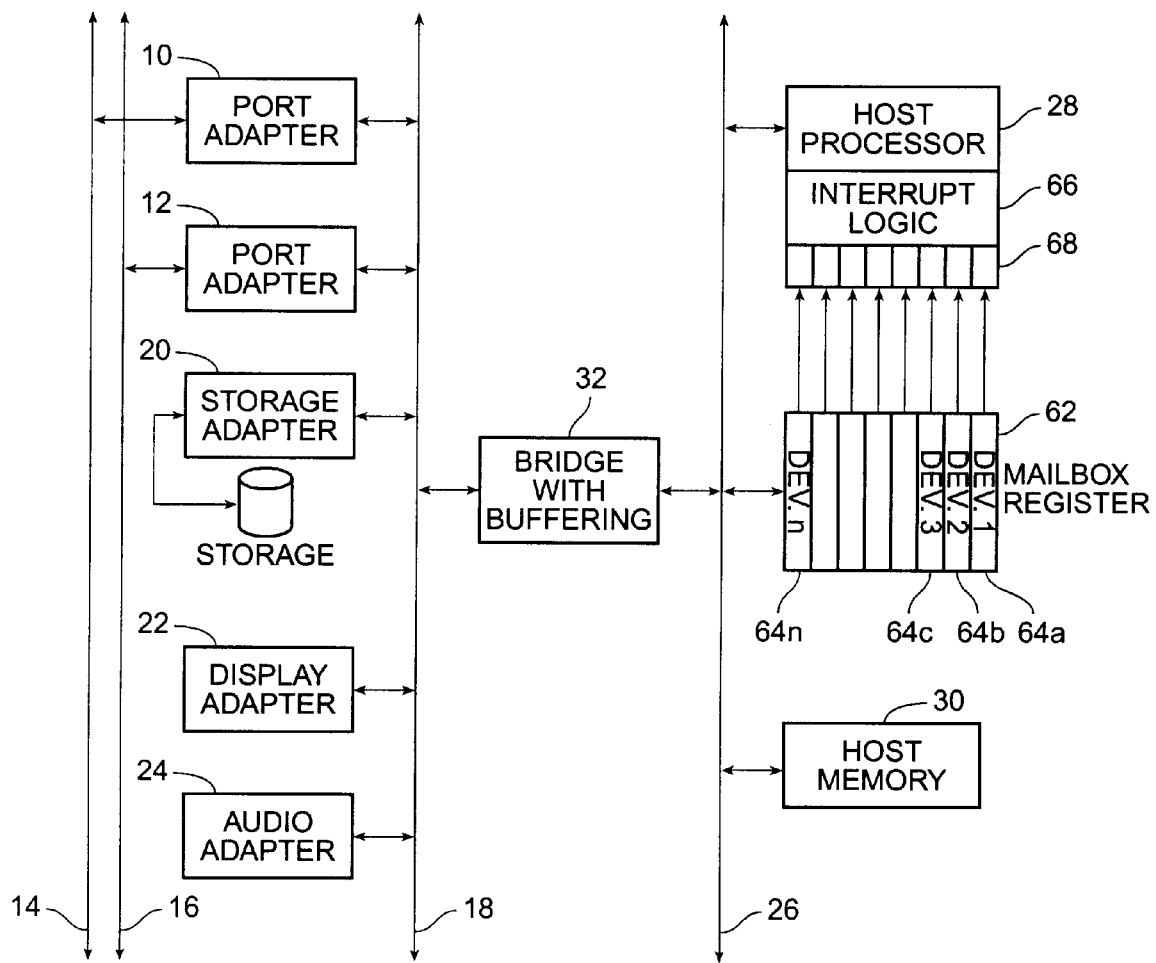
FIG. 6 is a system block diagram of a system having a buffered transaction bus and a mailbox register in accordance with a presently preferred embodiment of the present invention.

Turning now to FIG. 6, a system block diagram of a system having a buffered transaction bus and a mailbox register in accordance with a presently preferred embodiment of the present invention is shown.

Figure 2:
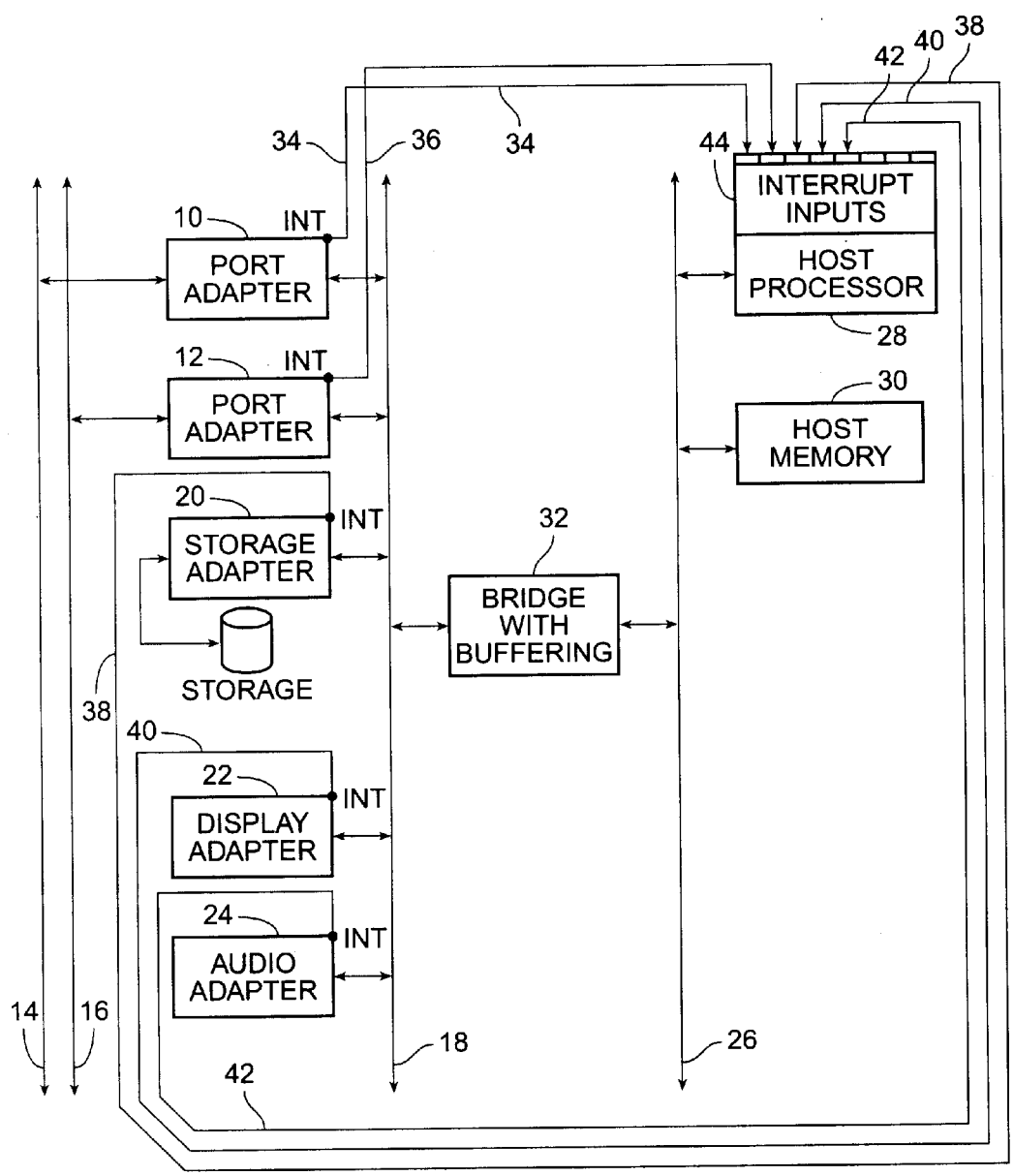
FIG. 2 is a system block diagram of a system having a buffered transaction bus and hardwired interrupt structure.

In FIG. 6 the system differs from that of the prior art system shown in FIG. 2 in that a mailbox register 62 contains a series of one-bit (minimum) memory locations 64a, 64b, . . . , 64n. Each of the memory locations 64a, 64b, . . . , 64n is coupled to interrupt logic 66 associated with host processor 28 via interrupt register inputs 68.

Mailbox register 62 is a memory device much like host memory 30. A "1", for example, stored in memory location 64c means that host memory 30 has received data from device 3 (associated with memory location 64) and an interrupt request is pending. Host processor 28 receives this interrupt request through interrupt logic 66 coupled to interrupt register inputs 68 which are in turn coupled to individual memory locations in mailbox register 62.

Proper sequencing is achieved because data is written first to host memory 30 (using a posted write or delayed write or other suitable transaction), then data is written to mailbox register 62 using a mechanism that cannot pass the previously written data to indicate that an interrupt is requested. Because the interrupt data block follows the actual data blocks through the buffered bus, it will not arrive before the actual data is posted in host memory 30, and hence proper sequencing is assured.

Figure 7:
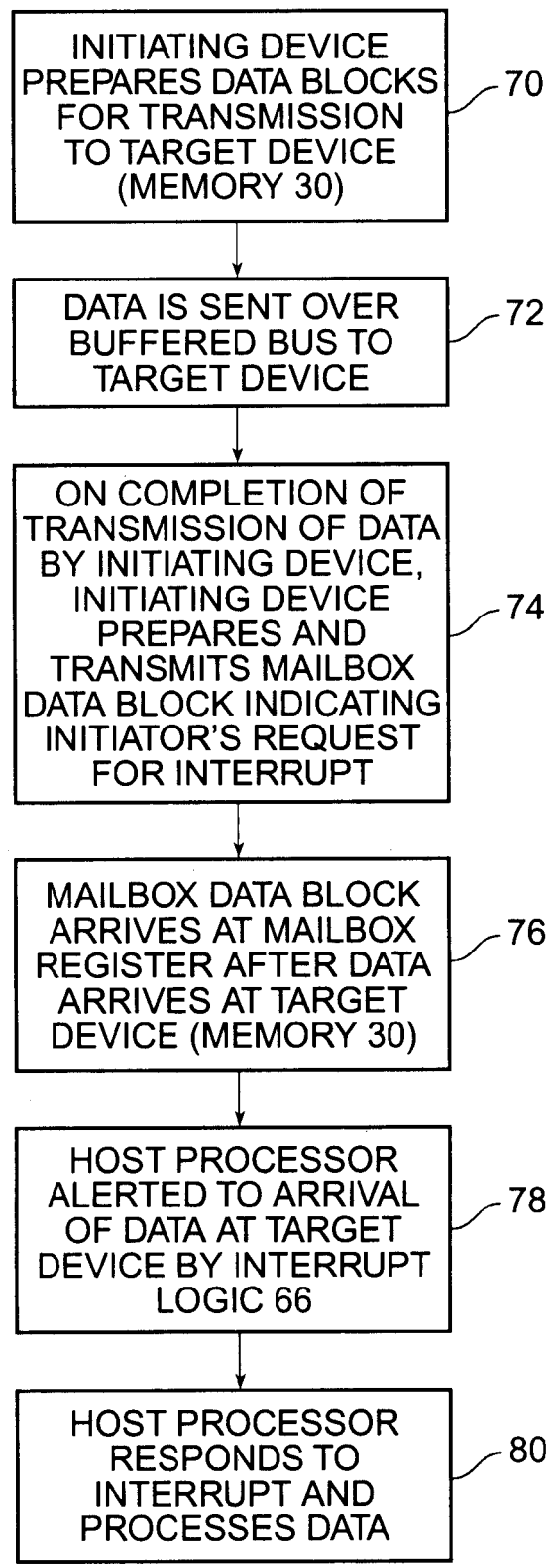
FIG. 7 is a flow chart of a method for writing data to a target device from an initiating device in accordance with a presently preferred embodiment of the present invention.

Turning now to FIG. 7, a flow chart of a method for writing data to a target device from an initiating device in accordance with a presently preferred embodiment of the present invention is shown.

At reference numeral 70 the initiating peripheral device prepares data for transmission to the target device. In one embodiment of the invention the peripheral device is a port adapter and the data is a received packet. The target device is host memory 30.

At reference numeral 72 the data is transmitted over the buffered bus to the target device, incurring potential latency delays due to buffering.

At reference numeral 74, upon completion of the transmission of the data by the peripheral device, the peripheral device then prepares and transmits a mailbox data block indicating the initiator's request for an interrupt to process the data which will be waiting in host memory 30 when the mailbox data block is received at the mailbox register. Those of ordinary skill in the art will realize that the mailbox register could take many forms, but the simplest form is a series of one-bit memories, each corresponding to one of the initiating peripheral devices in the system.

At reference numeral 76 the data arrives at the host memory 30 followed by the arrival of the mailbox data block at mailbox register 62.

At reference numeral 78 the host processor 28 is alerted to the arrival of data at host memory 30 by the interrupt logic 66 coupled, ultimately, to the individual memories in mailbox register 62.

At reference numeral 80 the host processor responds to the interrupt by signaling the initiating device (if required) and by processing the data now waiting in the host memory 30.

In an alternative embodiment the host process can respond to the interrupt by writing to the mailbox register, e.g., by changing the state of the bit set.

Note that in the case where a packet is written into memory, in a preferred embodiment the data portion of the packet will usually be written first in one or more write transactions followed by a link list or header portion, followed by the mailbox register write in a separate write transaction.

The approach detailed herein is particularly advantageous because it assures that the data is waiting in host memory 30 before the host processor 28 receives the interrupt request. It thus avoids any need for a clearing read or verifying read transaction. It permits full buffering and use of bridges 50 so no separate communication paths are required to transmit interrupt information, and it is fully compatible with commercially available bridge chips available from a number of well known vendors.

Alternative Embodiments

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for sending data from an initiating device to a host processor coupled to a host memory and a mailbox register, said method comprising:

transmitting the data over a buffered bus from the initiating device to the host memory;

buffering the data transmission between the initiating device and the host memory;

issuing an interrupt request over the buffered bus from the initiating device to the mailbox register so as to set a corresponding location in the mailbox register corresponding to the initiating device to indicate a pending interrupt request from the corresponding initiating device, said issuing the interrupt request occurring after said transmitting the data over the buffered bus is complete;

reading the contents of the corresponding location with the host processor;

detecting an interrupt when said corresponding location is set to indicate a corresponding pending interrupt request; and processing the data in the host memory in response to detecting the interrupt request.

2. A method in accordance with claim 1, further comprising:

responding to said interrupt request.

3. A method in accordance with claim 2 wherein said responding includes resetting the contents of the corresponding location within the mailbox register.

4. A method in accordance with claim 2 wherein said responding includes signaling the initiating device.

5. A method in accordance with claim 3, further comprising:

reading with the initiating device the reset contents of the corresponding location within the mailbox register.

6. An apparatus for communicating data from a first plurality of initiating devices, comprising:

a buffered bus in communication with the first plurality of initiating devices;

a host memory in communication with the buffered bus;

a mailbox register having a second plurality of memory locations, said mailbox register in communication with said buffered bus, wherein each particular memory location corresponds to a particular initiating device; and a host processor in communication with said host memory and said mailbox register, said host processor having a third plurality of interrupt inputs, each particular interrupt input corresponds to a particular memory location, wherein each particular memory location is responsive to an interrupt request signal from a corresponding particular initiating device to indicate that an interrupt request has been issued by the device to said host processor, and wherein the interrupt request signal is issued over said buffered bus after said data is transmitted over said buffered bus.

7. An apparatus according to claim 6 wherein said host processor reads the data from said host memory in response to receiving said interrupt request.

8. An apparatus according to claim 7 wherein said host processor processes the data read from said host memory.

9. An apparatus according to claim 8 wherein said host processor signals the initiating device in response to receiving said interrupt request.

10. An apparatus according to claim 8 wherein said host processor resets said interrupt request signal in response to receiving said interrupt request.

11. An apparatus according to claim 6 further comprising:
a bridge disposed in said buffered bus.

12. An apparatus according to claim 11 where said bridge supports posted write transactions and the indicating devices use posted write transactions to communicate the data over said buffered bus.

13. An apparatus according to claim 12 wherein the initiating devices use posted write transactions to communicate mailbox register contents over said buffered bus.

* * * * *